United States Patent [19]

Eckert

[11] 4,333,669
[45] Jun. 8, 1982

[54] BRAZED OR SOLDERED JOINTS

[75] Inventor: Roland Eckert, Sulzfeld, Fed. Rep. of Germany

[73] Assignee: E.G.O. Elektro-Geräte Blanc und Fischer, Fed. Rep. of Germany

[21] Appl. No.: 142,919

[22] Filed: Apr. 23, 1980

[30] Foreign Application Priority Data

Apr. 28, 1979 [DE] Fed. Rep. of Germany ....... 2917335

[51] Int. Cl.³ .............................................. F16L 13/08
[52] U.S. Cl. ..................................... 285/21; 285/115; 285/287
[58] Field of Search ................... 285/115, 116, 287, 21

[56] References Cited

U.S. PATENT DOCUMENTS

| 468,298 | 2/1892 | White et al. | 285/287 |
| 1,044,013 | 11/1912 | Burnett | 285/116 |
| 2,776,550 | 1/1957 | Magester | 285/115 X |
| 3,837,688 | 9/1974 | Vollbehr | 285/287 X |

FOREIGN PATENT DOCUMENTS

| 2104745 | 8/1972 | Fed. Rep. of Germany | 285/115 |
| 52-29622 | 3/1977 | Japan | 285/287 |

Primary Examiner—Thomas F. Callaghan
Attorney, Agent, or Firm—Steele, Gould & Fried

[57] ABSTRACT

The brazed or soldered joint is for the connection of a capillary tube, namely of a very thin, flexible metal tube, with a test point or with an expansion chamber of a temperature regulator operating with an expanding fluid. The brazing or soldering location between the connecting socket of the test point and the capillary tube is surrounded with a sheet-metal sleeve being folded from a sheet-metal strip and embraces the connecting socket, but leaves a slot open. The soldering material in the form of a brazing or soldering paste is placed into a window or into a triangular pocket, is firmly held in this position, thus the brazing or soldering may be carried out in a continuous-heating furnace. The sleeve extends far beyond the free end of the connecting socket and is at a distance from the capillary tube, thus it serves meanwhile as a support against the excessive bending of the capillary tube.

10 Claims, 3 Drawing Figures

BRAZED OR SOLDERED JOINTS

BACKGROUND OF THE INVENTION

The invention relates to a brazed or soldered joint between a thin, flexible metal tube and a connecting socket, and particularly to metal tubes being connected to temperature sensors, to expansion chambers of temperature regulators, or control devices which operate with an expanding fluid.

Hitherto, these brazed or soldered joints were prepared by using a wire ring made of brazing or soldering material, which was wrapped around the metal tube prior to putting the parts to be brazed or soldered into the soldering oven and inside the oven the parts were brazed or soldered together. Such process results in a good and hermetic brazed or soldered joint, however it can be carried out only if the brazing or soldering material is available in the shape of a wire. In these types of soldered or brazed joints, particularly when a thin capillary tube has to be joined, the danger also exists that the capillary tube may break off at the position of brazing or soldering. The conventional soldering materials, e.g. silver solder, may lead to corrosive effects when parts of stainless steel are joined in conjunction with some electrolytes.

From GB-PS No. 942 164 a method is already known for the soldering of a connecting socket into the inside of a large diameter pipe, having a capillary gap between the parts to be soldered and a crevasse in the area of said gap for the deposition of the solder which then after will fill the gap.

SUMMARY OF THE INVENTION

The objective of the present invention is to create a brazed or soldered joint of the type described in the introduction, which can be carried out by simple means and without complex technological effort, wherein the metal tube will not only be hermetically sealed but will also be supported against mechanical strains on the connecting socket.

According to the present invention this objective is achieved by surrounding the connecting socket with a thin-walled metal sleeve, which extends by a considerable distance beyond the free end of the connecting socket and which surrounds the metal tube, but with a large free clearance even after the completion of the brazing or soldering. The metal sleeve is provided with at least one aperture into which the brazing or soldering material can be deposited in the form of a paste which will braze or solder together the metal tube and the sleeve with the connecting socket.

The purpose of this metal sleeve is not only to assist the deposition of the brazing or soldering paste to the correct location and to guide the solder therefrom into the joint, but it serves also as a support for the metal tube when it is being bent to a certain angle, thus preventing a sharp bend particularly at the sensitive brazed or soldered location.

This allows the application of special brazing or soldering materials to be used with stainless steel, which retain their special properties even after the completion of the brazing or soldering and can be applied in the form of pastes. This secures the resistance of the brazed or soldered joints to high temperatures and against corrosion. A further advantage is that the brazing or soldering may be carried out using a continuous-heating furnace.

DETAILED DESCRIPTION OF THE PREFERRED EMBODIMENTS

Figure 1:
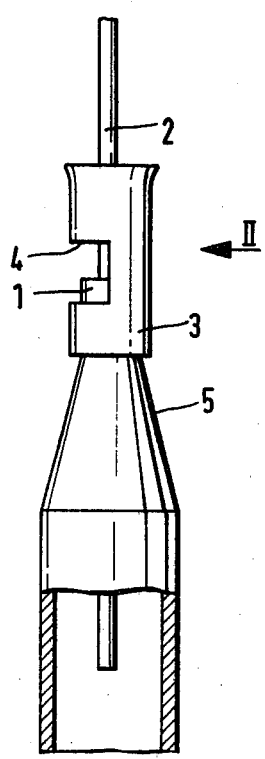
FIG. 1 is a side elevation, in enlarged scale, of a first embodiment of a brazed or soldered joint according to the invention.
Figure 3:
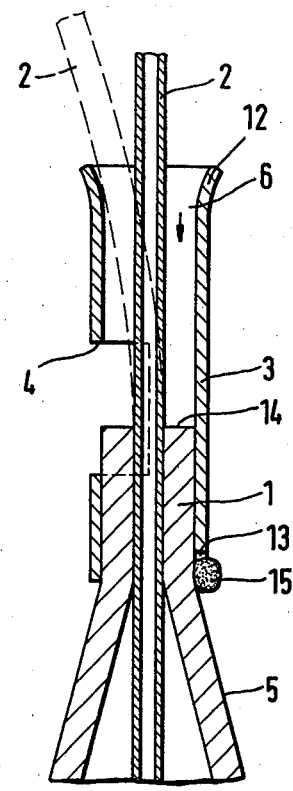
FIG. 3 is a longitudinal section of FIG. 1.

The illustrated joint illustrates a brazed or soldered connection between the connecting socket 1 of a hydraulic temperature regulator's sensor 5 and a flexible metal capillary tube 2 inserted into the connecting socket 1, the external diameter of said capillary tube 2 being very small (on the order of magnitude of 1 mm) and corresponding basically to the internal diameter of the connecting socket 1.

A folded metal sleeve 3, made of a thin sheet-metal strip (e.g. 0.2 mm thick), is positioned around the connecting socket 1 (being slid-on or bent around). It overlaps the connecting socket—which may be for example 3 mm in diameter—over a small portion of the sleeve (e.g.. 2 mm) in its longitudinal direction, while the major part of its length (e.g. 4 mm) is extending beyond the end 14 of the connecting socket 1. The connecting socket is provided with a thick wall in such a manner that a free annular gap 6 of, for example, 1 mm is left free between the sleeve 3 and the tube 2 (surrounding the tube), this gap being left free even after the completion of the brazing or soldering. The opposing edges 10 of the sleeve 3 made of the sheet-metal strip create an aperture in the shape of an open slot 11, thus the sleeve is clamped onto the connecting socket 1 by an elastic tensioning force. A triangular cutout 13 is formed at the end of this slot facing the connecting socket by having the corners of the sheet-metal strip cut off. The other end of the sleeve is provided with a conical funnel-shaped flaring 12.

The parts are of stainless steel. The sleeve 3 is provided on one of its sides, shown always on the left hand side on the drawing, with an aperture 4 being in the form of a window-like cutout, this being so arranged as to render accessible the free upper end of the connecting socket 1 and the area of the capillary tube 2 which adjoins the upper end of the former.

The brazed or soldered joint between the connecting socket 1 and the capillary tube 2 is made in the following manner:

The sleeve 3 is positioned onto the connecting socket 1 and the capillary tube 2 is inserted from above into the connecting socket 1. Thereafter, a small quantity 15 of paste-like brazing or soldering material is deposited into the aperture 4 or preferably into the cutout 13 of the sleeve 3. This may be carried out for example with a hand operated dosing device, whereby preferably a chrome-nickel brazing paste should be applied. The so prepared assembly is then admitted to a continuous-heating furnace, wherein the binding material of the brazing paste 15 evaporates, while the brazing material penetrates into the cylindrical gap between the connecting socket 1 and the sleeve 3 together with the capillary tube 2 due to capillary effects. Meanwhile, the brazing material, by having been deposited onto the cutout 13, flows without hindrance over the free frontal surface of the connecting socket 1 and penetrates into the gap between the tube and the socket. In this type of application the aperture 4 may be omitted.

Figure 2:
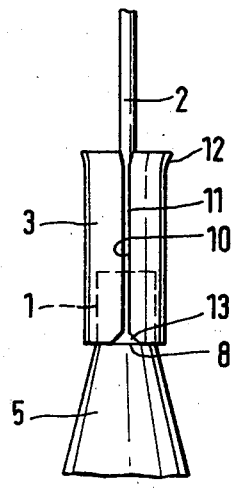
FIG. 2 is a side elevation of FIG. 1 viewed in the direction of arrow II.

Due to the width of the annular gap 6 there will be no capillary action therein, and the gap and the capillary tube 2 will be left free of brazing or soldering material. Accordingly, the tube may be bent, limited by the width of the annular gap (marked by dashed lines in FIG. 2), without the danger of damage being caused to this thin tube. The sleeve serves in this area as a support against excessive bending of the capillary tube 2, and this feature is further augmented by the flaring. Due to the appropriate affixation of the brazing or soldering material at the point of jointing, the brazing or soldering may be carried out in a continuous-heating furnace, in spite of using brazing or soldering materials in the paste form.

The connecting socket 1 is provided with a conical transition part for the connection to the tubular test point 5. This creates a shoulder 8 which in turn supports the sleeve 3.

The claims defining the invention are as follows:

1. A brazed or soldered joint between a connecting socket having a free end and a thin, flexible metal tube inserted therein, comprising a thin-walled metal sleeve surrounding the connecting socket, a portion thereof embracing the connecting socket and another portion thereof extending beyond the free end of the connecting socket, surrounding the metal tube but having a sufficiently large free clearance to preclude capillary action between the metal sleeve and the metal tube during the brazing or soldering, the metal sleeve being provided with at least one aperture in the area of the free end of the connecting socket into which brazing or soldering material can be deposited in the form of a paste which after heating will braze or solder together the metal tube and the sleeve to the connecting socket by capillary action, but will not hinder movement of the flexible metal tube within the metal sleeve, whereby the metal sleeve enhances the integrity of the brazed or soldered joint, and thereafter, prevents kinking and accidental breaking of the metal tube.

2. The joint of claim 1, wherein the aperture is provided on a part of the metal sleeve which covers the connecting socket and the metal tube.

3. The joint of claims 1 or 2, wherein the aperture is in the form of a window-like cutout in the metal sleeve.

4. The joint of claim 1, wherein the metal sleeve is folded from a sheet-metal strip, the aperture being formed by a slot defined between opposing longitudinal edges of the folded sheet-metal strip, the sleeve being self-clamping.

5. The joint of claim 4, wherein a cutout is provided in at least one of the opposing longitudinal edges, forming an expansion of the slot and serving as a receptacle for the brazing or soldering material, the cutout being located at that end of the metal sleeve abutting the connecting socket.

6. The joint of claim 5, wherein the cutout is triangular.

7. The joint of claim 1, wherein that part of the metal sleeve extending beyond the free end of the connecting socket is longer than that part of the metal sleeve which covers the connecting socket.

8. The joint of claim 1, wherein the metal tube and the metal sleeve are stainless steel and the brazing or soldering paste is a chrome-nickel brazing paste.

9. The joint of claim 1, wherein the connecting socket is provided with a shoulder upon which the sleeve is axially supported.

10. The joint of claim 1, wherein the sleeve has a free end with a funnel-shaped flaring.

* * * * *